United States Patent [19]
Davis

[11] 3,815,038
[45] June 4, 1974

[54] DIFFERENTIAL AMPLIFIER CIRCUITS
[75] Inventor: Thomas J. Davis, Richland, Wash.
[73] Assignee: The United States of America as represented by the United States Atomic Energy Commission, Washington, D.C.
[22] Filed: Apr. 13, 1973
[21] Appl. No.: 350,861

[52] U.S. Cl. .................. 330/30 D, 330/35, 330/17, 330/20, 330/18
[51] Int. Cl. ............................................. H03f 3/68
[58] Field of Search ................ 330/30 D, 17, 20, 18

[56] References Cited
UNITED STATES PATENTS
3,562,659   2/1971   Kulas ................................ 330/18 X

*Primary Examiner*—Nathan Kaufman
*Attorney, Agent, or Firm*—John A. Horan; Arthur A. Churm; Paul A. Gottlieb

[57] ABSTRACT

A differential amplifier circuit has two transistors of opposite polarity. The emitters of the two transistors are coupled in series by a resistor while a collector of one transistor is coupled to a voltage source by another resistor, equal in value to the first resistor, which will reverse-bias that collector. The collector of the other transistor is also coupled to a voltage source of different potential than the first source. The polarities of the voltage sources are chosen to reverse-bias the collector of each transistor. The input signals are applied to the base of each transistor. The output taken between the two collectors will be the difference between the inputs.

4 Claims, 2 Drawing Figures

DIFFERENTIAL AMPLIFIER CIRCUITS

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

Certain types of measuring devices develop small-intensity signals which have a low signal to noise ratio and which require large amplification for processing. A major contribution to low signal to noise ratio is external noise effects caused by ambient electromagnetic fields. Common mode rejection is a method for eliminating external noise and enhancing the signal to noise ratio by utilizing two signals representative of the same event but of opposite polarity. External noise effects will be common to both signals so that, by subtracting one signal from the other, external noise effects are rejected, leaving a signal representative of the event. This subtraction of two signals is commonly accomplished by using a differential amplifier circuit which is designed to produce an output signal corresponding to a voltage difference between two input signals.

Acoustic emission testing of, for example, nuclear reactor pressure vessels develops a small-intensity emission testing signal which requires large amplification to be useful. Since acoustic emission testing of this kind is conducted in a severe electrical environment containing external noise sources such as ambient electromagnetic fields and incident radiation, signal to noise ratio is low.

Application of common mode rejection to high-frequency signals such as those developed in acoustic emission tests has been limited by distortion in the differential amplifier caused by high-frequency effects. The conventional differential amplifier employs two common emitter amplifier transistors of the same polarity with both emitters tied to a constant current sink. Subtraction action is severely limited at high frequencies due to stray capacitance developing in the current sink. Performance is also degraded by unequal phase changes occurring in the two input channels with frequency variation.

It is therefore an object of this invention to provide an improved differential amplifier circuit.

Another object of this invention is to provide a common mode rejection circuit for use at high frequencies.

SUMMARY OF THE INVENTION

Differential amplification is obtained using two transistors of opposite polarity. The emitters of these transistors are coupled in series by a resistor and the collector of one transistor is coupled in series with another resistor to a voltage source at a potential which will reverse-bias that collector. Both resistors are of equal value. The collector of the other transistor is coupled to a voltage source at a different potential, which will reverse-bias that collector. With an input applied to the base of each transistor, respectively, an output taken between the collectors of the two transistors will be the difference between the two input signals.

DETAILED DESCRIPTION OF THE PREFERRED EMBODIMENT

Figure 1:
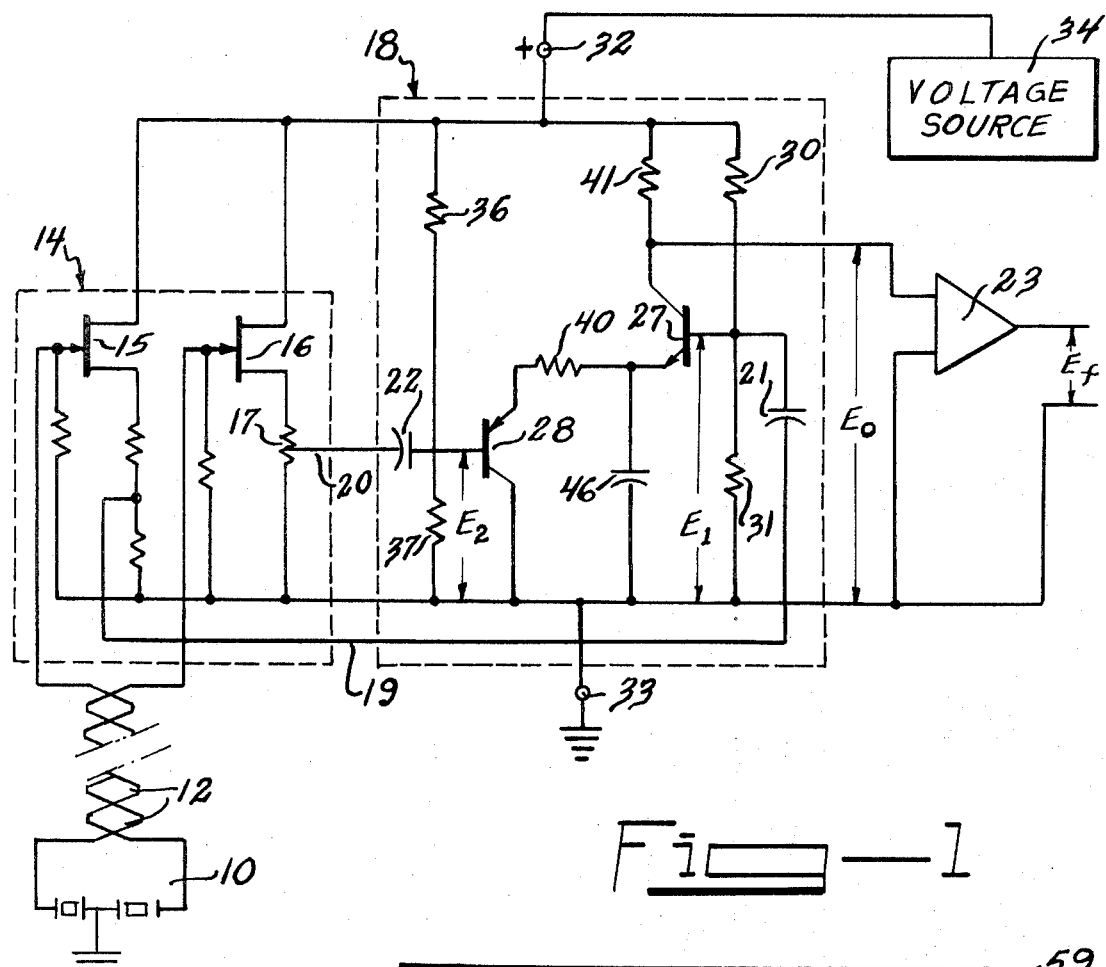
FIG. 1 is a schematic of the differential amplifier of this invention.

Referring to FIG. 1, there is shown the differential amplifier as used in a high-frequency acoustic emission testing circuit. A typical acoustic emission test involves acoustic interaction with the tested device such as a pressurized reactor vessel. A dual element transducer 10 is coupled to the tested device (not shown) so that it will develop two testing signals of equal absolute magnitude but opposite polarity. These signals are transmitted by similar transmission lines 12 to an input amplifier 14. By developing and transmitting two signals in this manner, any external noise, caused by ambient electromagnetic fields and incident radiation associated with reactor operation, will have a common effect on both testing signals so that subtraction of the two testing signals will tend to reject the external noise.

As shown, input amplifier 14 is a well-known source follower amplifier, utilizing FET transistors 15 and 16, one for each testing signal, which provides a high input impedance for the differential amplifier and amplifies the feeble dual testing signals. Input amplifier 14 is also provided with a variable resistance 17 which allows zeroing of the device when no acoustic test is in progress, assuring that any difference between the two input testing signals will be associated with the acoustic testing.

The input amplifier is coupled to differential amplifier 18 via leads 19 and 20 and capacitors 21 and 22. Differential amplifier 18 produces an output corresponding to the difference between the two testing signals. Therefore, when there is no output from transducer 10 occasioned by an acoustic emission test, the output of differential amplifier 18 will be zero. The output from differential amplifier 18 is then fed to a conventional signal amplifier 23, such as a cable driver, to generate a usable output signal $E_f$.

Transistors 27 and 28 form the core of differential amplifier 18. In this embodiment, transistor 27 is of the NPN type in the common emitter mode. Base biasing is provided by the voltage divider comprised of resistors 30 and 31 coupled to a terminal 32 of a voltage source 34 at positive potential and a ground terminal 33. Transistor 28 is of the PNP type in the common collector mode. Base biasing is provided by the voltage divider comprised of resistors 36 and 37 coupled to terminal 32 of voltage source 34 and ground terminal 33. The emitters of transistors 27 and 28 are coupled in series by resistor 40, of value $R_1$, while resistor 41 of value $R_2$ couples the collector of transistor 27 to terminal 32 in order to reverse-bias that collector. The collector of transistor 28 is reverse-biased by direct coupling to terminal 33.

Via lead 19, one testing signal of value $E_1$ is applied to the base of transistor 27 with the output of transistor 27 due to $E_1$ being equal to $-R_2/R_1 (E_1)$. Via lead 20, another testing signal of value $E_2$ is applied to the base of transistor 28. The output of transistor 28 due to $E_2$ is applied to resistor 40 which acts as a common base drive to transistor 27 whose output due to this common base drive will be equal to $R_2/R_1$ ($E_2$). The total output $E_o$ of differential amplifier 18 due to both $E_1$ and $E_2$ will be $R_2/R_1$ ($E_2$) - $R_2/R_1$ ($E_1$). If $R_2$ equals $R_1$, the output $E_o$ of differential amplifier 18, taken between the collectors of transistors 27 and 28, will be equal to $E_2 - E_1$. Both $E_1$ and $E_2$ include a testing signal component produced by dual element transducer 10, with the testing signal component of $E_1$ being of equal absolute magnitude but opposite polarity to the testing signal component of $E_2$. In addition, both $E_1$ and $E_2$ include a component produced by external noise, with the external noise component of $E_1$ being of equal magnitude and polarity to the external noise component of $E_2$ because of the similar treatment of the signals by transmission lines 12 and input amplifier 14. Therefore, the $E_2 - E_1$ output of the differential amplifier will result in the subtraction out of the external noise components and the addition together of the testing signal components of $E_1$ and $E_2$.

Acoustic emission testing signals are of a high frequency. At high frequency the disclosed differential amplifier will have a tendency for Miller capacitance to affect the operation of transistor 27. Capacitor 46, which couples the emitter of transistor 27 to terminal 33, provides emitter peaking for transistor 27 to reduce the effect of Miller capacitance. Since transistor 28 operates in the common collector mode, it is relatively immune from the Miller effect. The reduction of Miller effect provided by capacitor 46 enhances the common mode rejection at high frequencies by equalizing phase shift in inverting and non inverting channels. Another limitation of conventional differential amplifiers employing two transistors of the same polarity is limited dynamic range because an input which increases conduction in one transistor tends to reverse bias the emitter of the other transistor. The disclosed circuit is free from this limitation because an input-caused variation in the collector current of one transistor causes a corresponding change in the collector current in the other transistor. Thus, because of the series connection of the two transistors, an increase in conduction in one transistor causes a similar increase in the other transistor rather than driving the other transistor towards base-emitter cutoff.

Figure 2:
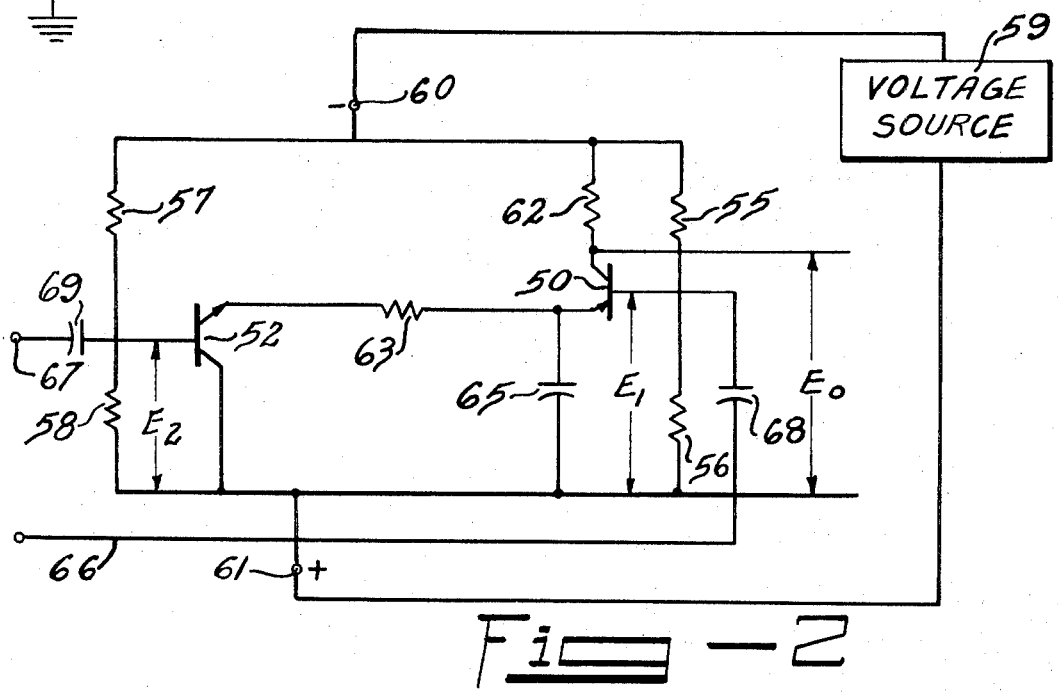
FIG. 2 is a partial schematic of an alternate arrangement for the two transistors of the differential amplifier.

Referring to FIG. 2, there is shown an alternate embodiment of differential amplifier 18 of FIG. 1. In the embodiment of FIG. 2, transistor 50 is of the PNP type in the common emitter mode, while transistor 50 is of the NPN type in the common collector mode, a reversal of positions from the embodiment of FIG. 1. Base biasing to transistors 50 and 52 is provided, respectively, by the voltage dividers comprised of resistors 55 and 56, and 57 and 58, coupled to terminals 60 and 61 of voltage source 59. Terminal 60 is of less positive potential than terminal 61. The collector of transistor 50 is coupled to terminal 60 via resistor 62 in order to reverse-bias the collector, while the collector of transistor 52 is reverse-biased by being coupled to terminal 61. Resistor 63, of equal value to resistor 62, couples the emitter of transistor 50 to the emitter of transistor 52. Capacitor 65 provides emitter peaking for transistor 50 to limit distortion due to the Miller effect. Except for the reversal of positions of the two transistors and of the relative potentials of the biasing terminals, the embodiment of FIG. 2 is the same as the embodiment of FIG. 1. The differential amplifier of FIG. 2 is coupled to the input amplifier (not shown) via leads 66 and 67 and capacitors 68 and 69. The analysis of this embodiment follows that described for the embodiment of FIG. 2.

The embodiments of the invention in which an exclusive property or privilege is claimed are defined as follows:

1. A differential amplifier, comprising a first transistor having an emitter, collector and base, a second transistor of opposite polarity to said first transistor and having an emitter, collector and base, a first resistor coupling said emitter of said first transistor to said emitter of said second transistor, biasing voltage supply means having a first terminal and a second terminal, a second resistor of equal value to said first resistor coupling said collector of said first transistor to said first terminal, said collector of said second transistor being coupled to said second terminal, said first terminal being of different potential from said second terminal such that said collector of said first transistor and said collector of said second transistor are reverse-biased, a first input terminal coupled to said base of said first transistor, a second input terminal coupled to said base of said second transistor, and an output terminal coupled to said collector of said first transistor.

2. The differential amplifier of claim 1 further including a capacitor coupling said emitter of said first transistor to said second terminal, thereby providing emitter peaking for said first transistor to limit the effect of Miller capacitance.

3. The differential amplifier of claim 2 wherein said first transistor is of the NPN type, the second transistor is of the PNP type, and said first terminal of said biasing means is of more positive potential than said second terminal.

4. The differential amplifier of claim 2 wherein said first transistor is of the PNP type, the second transistor is of the NPN type, and said second terminal of said biasing means is of more positive potential than said first terminal.

* * * * *